United States Patent [19]

Meshkat et al.

[11] Patent Number: 5,125,038
[45] Date of Patent: Jun. 23, 1992

[54] FACE AND EDGE TRIM METHOD FOR AN AUTOMATIC MESH GENERATION SYSTEM

[75] Inventors: Siavash N. Meshkat, San Jose; James M. Ruppert, Berkeley, both of Calif.

[73] Assignee: International Business Machine Corporation, Armonk, N.Y.

[21] Appl. No.: 644,181

[22] Filed: Jan. 22, 1991

[51] Int. Cl.$^5$ .......................... G06K 9/48; G06K 9/00; G06G 7/48
[52] U.S. Cl. .......................................... 382/22; 382/1; 364/578
[58] Field of Search ............... 364/577, 578, 754, 518, 364/521, 522, 746.1; 382/21, 22, 156, 54, 23; 340/729, 747

[56] References Cited

U.S. PATENT DOCUMENTS

| | | | |
|---|---|---|---|
| 4,829,446 | 5/1989 | Draney | 364/488 |
| 4,888,713 | 12/1989 | Falk | 364/522 |
| 4,912,664 | 3/1990 | Weiss et al. | 364/577 |
| 4,930,092 | 5/1990 | Reilly | 364/522 |
| 4,933,889 | 6/1990 | Meshkat et al. | 364/578 |

OTHER PUBLICATIONS

K. Koyamada, Method to Reconstruct Solid Elements Into Linear Tetrahedral Elements, vol. 32, No. 1 Jun. 1989 pp. 340-342, IBM Tech. Disclosure Bulletin.
D. E. Schreiber, Computing a Set of Triangular Plates which Represent a Potential Surface of a Scaler Function Defined at the Vertices of a Three Dimensional Cartesian Mesh., vol. 18 No. 4 Sep. 1975 pp. 1163-1176, IBM Technical Disclosure Bulletin.
Cavendish et al., Approach to Automatic Three-Dimensional Finite Element Mesh Generation, National Journal For Numerical Methods In Engineering, vol. 21, 329-347 (1985).
William H. Frey, Selective Refinement: A New Strategy For Automatic Node Placement In Graded Triangular Meshes, International Journal For Numerical Methods In Engineering, vol. 24 2183-2200 (1987).
W. J. Schoeder Geometry-Based Fully Automatic Mesh Generation and the Delaunay Triangulation, Intl. Jour. For Numerical Methods In Engineering, vol. 26 2503-2515 (1988).
David A. Field, Implementing Watson's Algorithm In Three Dimensions, 1986 246-259, General Motors Research Laboratories.
Cendes et al., Magnetic Field Computation Using Delaunay Trianguation And Complementary Finite Element Methods, IEEE Transactions On Magnetics, vol. Mag. 1 No. 6 Nov. 1983 pp. 2551-2554.
Yerry et al., Automatic Three-Dimentional Mesh Generation By the Modified-Octree Technique, Int'l. Jour. For Numerical Methods In Engineering, vol. 20 1965-1990 (1984).

Primary Examiner—Michael Razavi
Assistant Examiner—Michael R. Cammarata
Attorney, Agent, or Firm—Perman & Green

[57] ABSTRACT

A method is described for producing a mesh of finite elements that are entirely within a body to be analyzed, the body exhibiting edges and surfaces. The method comprises the steps of: producing an initial mesh of elements for the body, each element having a plurality of vertices and edges; finding any body edge segment which is not coincident with a finite element edge and adding a vertex on that segment, the added vertex positioned to minimize the number new vertex points needed on the body edge segment. Additional finite elements are then created by connecting the new vertex to adjacent close vertices. A finite element is now identified which has both an edge coincident with an edge segment of the body and another edge segment that passes through a face of the body. A new vertex is placed on the body face in the vicinity of an intersection of the intersecting element edge so as to minimize the number of added required vertices, and the method then creates additional finite elements by connecting the added vertex to adjacent close vertices.

9 Claims, 10 Drawing Sheets

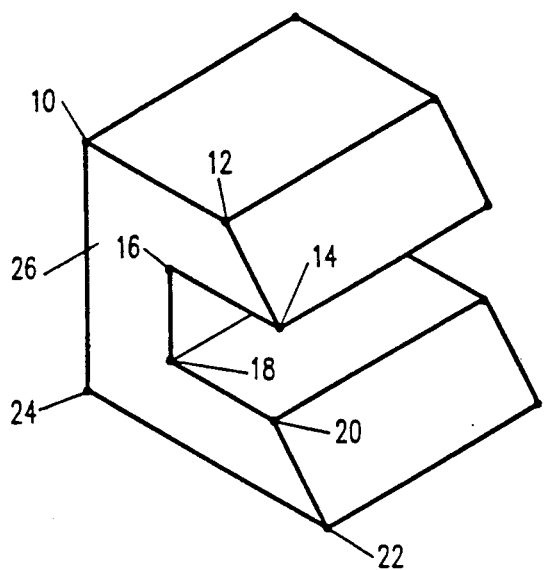
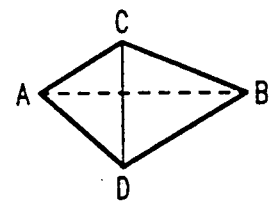
FIG. 2
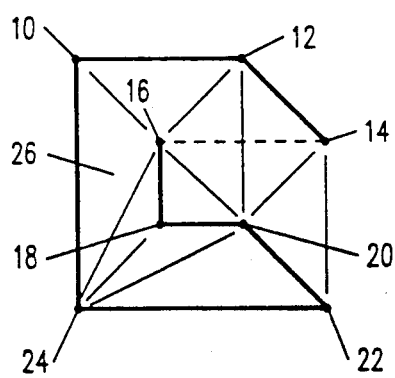
FIG. 1
FIG. 3
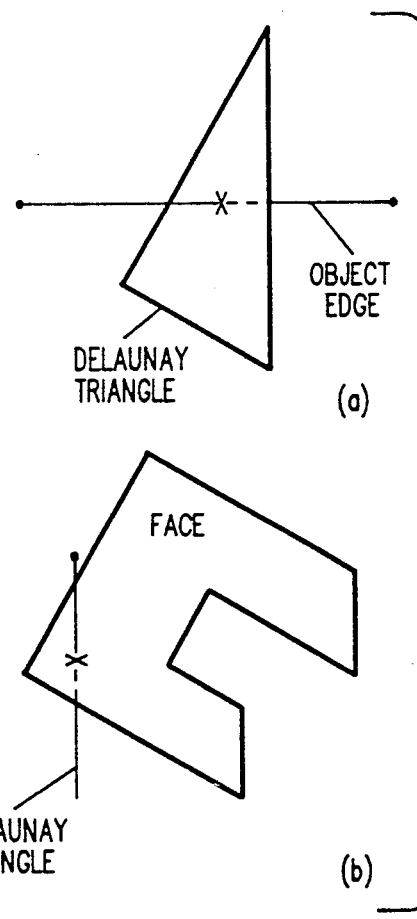
FIG. 4

FACE AND EDGE TRIM METHOD FOR AN AUTOMATIC MESH GENERATION SYSTEM

FIELD OF THE INVENTION

This invention relates to a method for enabling finite element analysis and, more particularly, to a method for automatically trimming a generated mesh to insure that all finite elements are either totally within or totally without a body to be analyzed.

BACKGROUND OF THE INVENTION

Automated modelling and design procedures involve the initial development of a geometric model of a body and the association therewith of various boundary conditions, material properties, and an indication of allowable error in a subsequent structural analysis. The analysis may then be carried out, automatically, by utilizing an adaptive scheme for producing a mesh that divides the model into a plurality of finite elements, which elements are then individually analyzed.

Ideally, the generation of the mesh should be fully automatic, i.e., one which takes, as an input, a geometric representation of a model with associated mesh control information and then, automatically, produces a valid mesh. One approach to deriving a mesh relies upon the properties of the Delaunay triangulation (see the Frey and Cavendish papers cited below). The Delaunay method is based on triangulating a set of points in the model space to produce a mesh of finite elements which, in a three dimensional case, generally means a set of tetrahedral elements. Thus, the Delaunay method initially generates a set of points and then a triangulation of those points which satisfies the property that a circumsphere containing a tetrahedron contains no mesh points within its volume.

One of the problems with creating such a mesh is assuring that the finite elements are either entirely within or entirely without the boundary of the model, so that those that are without the boundary can be segregated and ignored during a subsequent analysis.

In FIG. 1, a perspective view of an exemplary model is shown, the model having essentially a C-shape. The model is defined by a plurality of vertices, with sets of vertices defining faces of the model (for instance, vertices 10, 12, 14, 16, 18, 20, 22, and 24 define face 26 of the model). As is well known, each vertex is entered as a set of coordinates which define its position in three-dimensional space.

To perform a finite element analysis on the model shown in FIG. 1, the vertices and faces of the model are subjected to a Delaunay tetrahedrization using a known Delaunay mesh generation program. In FIG. 2, a tetrahedron is shown which forms the basic output of the Delaunay method in three dimensions. In FIG. 3, a plan view of face 26 is shown, subsequent to the Delaunay tetrahedrization of the model. During the Delaunay procedure, it often occurs that the formed tetrahedra exhibit edges that cross boundaries of the model. Under such circumstances, such tetrahedra must be found and subdivided so as to fulfill the totally in/totally out criteria. In the case shown in FIG. 3, the tetrahedra defined by vertices 12, 14, 20, and 12, 16, 20 obscure the boundary between vertices 16 and 14. This anomaly must be corrected prior to performing a finite element analysis.

In FIGS. 4a and b, several common "violations" are illustrated which may occur during an initial Delaunay tetrahedrization. In FIG. 4a, an object edge is shown passing through the interior of a Delaunay triangle at a point other than at a vertex of the triangle. In FIG. 4b, a Delaunay triangle edge is shown which passes through a face F of the model, at a point other than at a vertex of face F on a vertex defining the edge. Both of these situations give rise to tetrahedra which violate the totally in/totally out criteria.

The prior art has attempted to cope with the above-defined violations in various ways. One of the earlier methods used to achieve the totally in/totally out criteria was to run the Delaunay procedure on a model and then to have the user examine the model and insert additional vertex points into the mesh to eliminate the violating tetrahedra. Certain prior art references attempt to avoid the problem through "smarter" generation of the initial mesh of points. For instance see the following references: "Automatic Three-Dimensional Mesh Generation by the Modified-Octree Technique", Yerry et al., International Journal For Numerical Methods and Engineering Column, Vol. 20, pp. 1965–1990 (1984); "An Approach To Automatic Three-Dimensional Finite Element Mesh Generation", Cavendish et al., International Journal for Numerical Methods and Engineering, Vol. 21, pp. 329–347 (1985); "Magnetic Field Computation Using Delaunay Triangulation and Complementary Finite Element Methods", Cendes et al., IEEE Transactions on Magnetics, Vol. Mag-19, No. 6, Nov. 1983, pp. 2551–2554; and "Selective Refinement: A New Strategy For Automatic Node Placement in Graded Triangular Meshes", Frey, International Journal for Numerical Methods in Engineering, Vol. 24, pp. 2183–2200 (1987).

In a paper entitled "Implementing Watsons Algorithm in Three Dimensions" by Field, International Journal of Numerical Methods and Engineering, Vol. 26, pp. 2503–2515 (1988), the problem of having tetrahedra near a solid's boundary and having portions of the tetrahedra extend over the boundary are recognized. However, the author only indicates that additional points are required to enable subdivision of such tetrahedra and does not further teach how to insert those points.

In an article entitled "Geometry-Based Fully Automatic Mesh Generation and the Delaunay Triangulation" by Schroeder et al., International Journal for Numerical Methods in Engineering, Vol. 26, pp. 2503–2515, a solution is presented to enable trimming of Delaunay-generated tetrahedra. Schroeder et al. teach that the additional points should be placed at the exact intersection of the boundary of the mesh element and the surface of the model. While this solution does achieve the totally in/totally out criteria, it can lead to a large number of points being added to the mesh. This creates many different tetrahedra at model points which do not necessarily require such detailed subdivisions. As a result, computations during a subsequent finite element analysis are substantially slowed due to the increased number of finite elements to be analyzed.

Other prior art having some bearing on mesh generation and improvements thereof can be found in U.S. Pat. Nos. 4,912,664 to Weiss et al.; 4,888,713 to Falk; 4,697,178 to Heckel and in the following IBM Technical Disclosure Bulletin articles—Vol. 32, No. 1, June 1989 pp. 340–342 (Koyamada) and Vol. 18, No. 4, Sep. 1975, pp. 1163–1175 (Schreiber).

Accordingly, it is an object of this invention to provide an improved finite element generation system wherein the totally in/totally out criteria for generated tetrahedra is automatically satisfied.

It is still another object of this invention to provide an automatic mesh generation system for three dimensional objects wherein the number of added mesh points generated to satisfy the totally in/totally out criteria is minimized.

SUMMARY OF THE INVENTION

A method is described for producing a mesh of finite elements that are entirely within a body to be analyzed, the body exhibiting edges and surfaces. The method comprises the steps of: producing an initial mesh of elements for the body, each element having a plurality of vertices and edges; finding any body edge segment which is not coincident with a finite element edge and adding a vertex on that segment, the added vertex positioned to minimize the number new vertex points needed on the body edge segment. Additional finite elements are then created by connecting the new vertex to adjacent close vertices. A finite element is now identified which has both an edge coincident with an edge segment of the body and another edge segment that passes through a face of the body. A new vertex is placed on the body face in the vicinity of the intersecting element edge so as to minimize the number of added required vertices, and the method then creates additional finite elements by connecting the added vertex to adjacent close vertices.

DESCRIPTION OF THE DRAWINGS

FIG. 1 is a perspective view of a model used in the explanation of the method.

FIG. 2 is a showing of a basic finite element, i.e. a tetrahedron.

FIG. 3 shows the results of an initial Delaunay triangulation of a face of the model of FIG. 1.

FIGS. 4a and 4b indicate "violations" of the totally in/totally out criteria for tetrahedra.

DETAILED DESCRIPTION OF THE INVENTION

As described above, the Delaunay mesh generation procedure for a solid object creates a mesh of tetrahedra. During generation of the mesh, the Delaunay procedure calculates circumspheres for each tetrahedron. The generated mesh may or may not fulfill the totally in/totally out criteria. As will become hereinafter apparent, the already-calculated circumspheres are employed by this invention to minimize the number of vertex points added and to improve the tetrahedrization structure.

Figure 5:
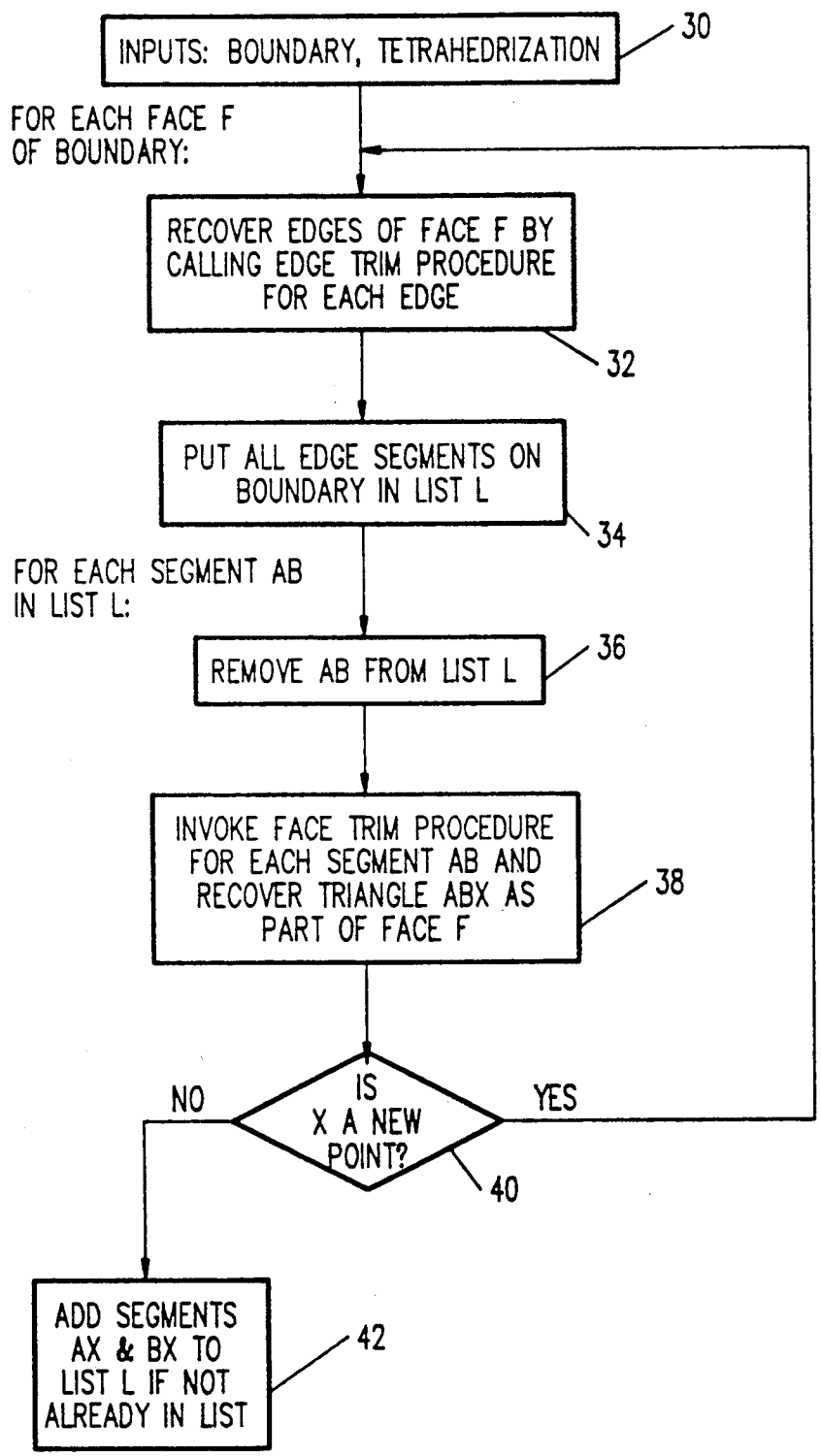
FIG. 5 illustrates a high level flow diagram of a the trim procedure embodying the invention.

Turning now to FIG. 5, a high level flow diagram of the overall trim procedure is described. In essence, the trim procedure assures that all tetrahedra fulfill the totally in/totally out criteria. The procedures to be described comprise a plurality of algorithms which control the operation of the general purpose computer. Such algorithms will execute on a workstation level system having graphical display capability.

The inputs to the general trim procedure are boundary definitions for the object to be analyzed and an already accomplished, finite element mesh created by a Delaunay tetrahedrization algorithm (box 30). For each face F of the object, the edges of the face are recovered by calling an edge trim procedure (box 32). This subroutine assures that for any object edge, or any segment thereof, that is not fully coincident with a tetrahedron edge, that an added vertex is provided which enables such object edge segment to be thereafter coincident with a tetrahedron edge.

Once all edge segments on a boundary have been recovered, they are placed in a list L for further processing (box 34). After this function has been carried out for all object faces, each object edge segment in list L is subjected to further processing to determine whether it intersects a face of the object, and if so, a vertex is added to subdivide the tetrahedron of which such intersecting segment is a part.

Initially, segment AB is removed from list L (box 36) and a face trim procedure is invoked. This allows a vertex point X to be found and a triangle ABX recovered as part of the face (box 38). If vertex X is new, then the edge trim procedure is repeated (box 40). If vertex X is not new, the segments AX and BX are added to list L, if they are not already listed therein (box 42).

Figure 6:
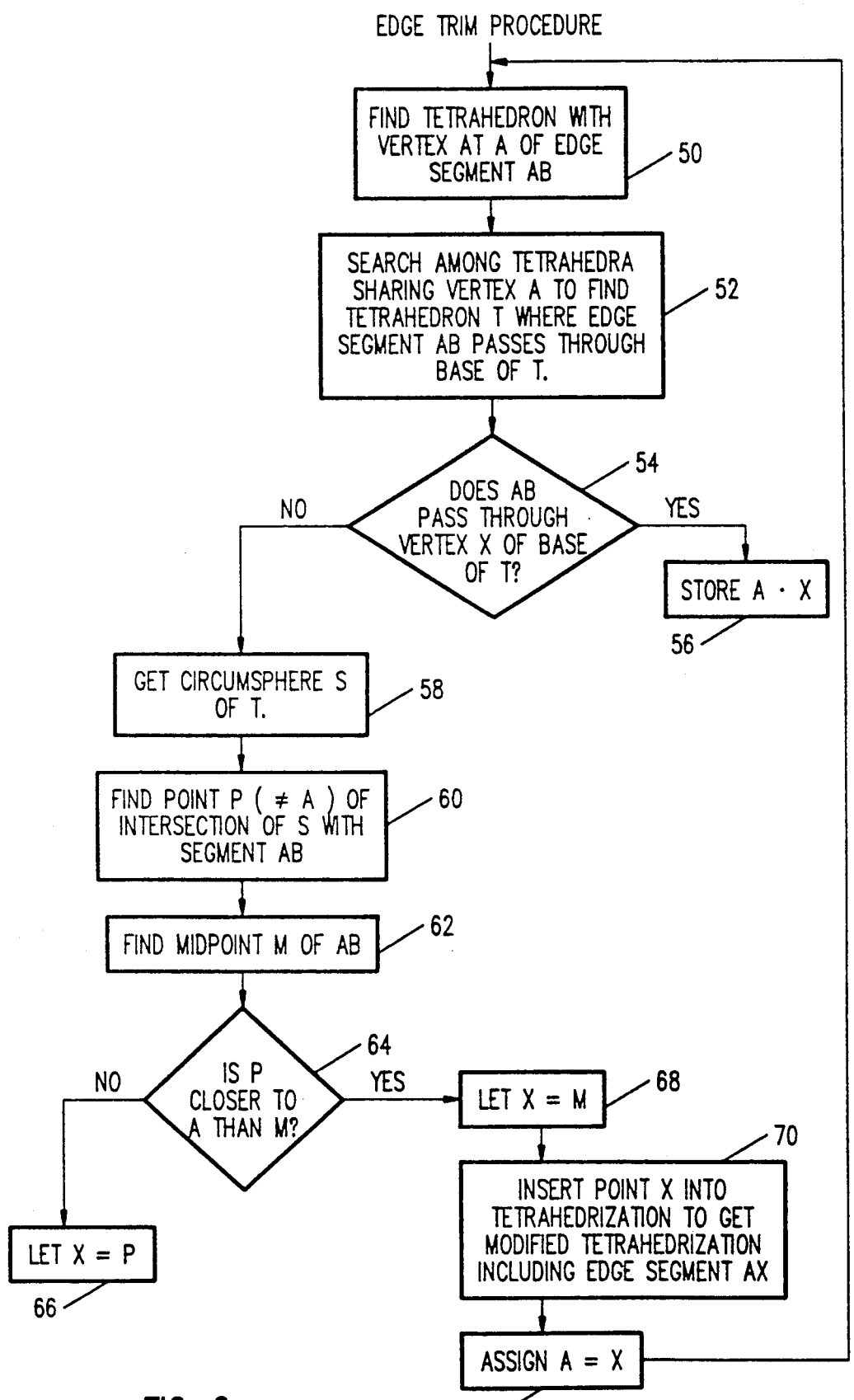
FIG. 6 is a high level flow diagram illustrating the edge trim procedure of the invention.

Turning now to FIG. 6, the details of the edge trim procedure will be described in conjunction with FIGS. 7-11. Prior to considering the flow diagram shown in FIG. 6, refer to FIG. 7 wherein edge segment AB is shown and comprises a portion of a the model boundary. As the model has already been subjected to Delaunay tetrahedrization, a plurality of tetrahedra are positioned about segment AB, however, it can be seen that segment AB is not coincident with any boundary of a tetrahedron. Thus, there is a violation of the totally in/totally out criteria.

Figure 7:
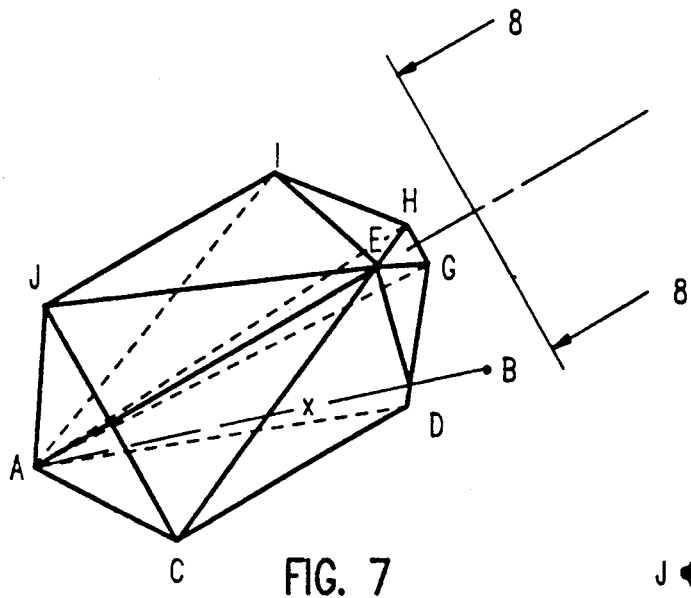
FIG. 7 is a perspective view of a model edge segment AB which is not coincident with an edge of any adjacent mesh tetrahedra.
Figure 8:
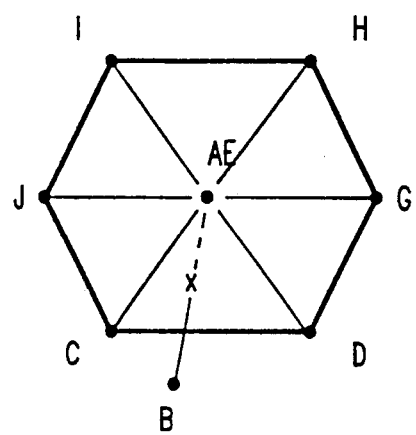
FIG. 8 is a view of FIG. 7 taken along line 8—8.

FIG. 8 is a view of the tetrahedron construct shown in FIG. 7, taken along line 8—8 and showing tetrahedron boundary AE end-on. That same view is used in FIG. 9 to illustrate how the tetrahedron encompassing model line segment AB is found. The search procedure is illustrated in the flow diagram of FIG. 6.

As shown at box 50, a tetrahedron is identified that has a vertex at point A of edge segment AB. (This search is simplified if, during the initial generation of the tetrahedral mesh, an incident tetrahedron is stored for each vertex). Once the incident tetrahedron is identified, a search is performed among tetrahedra sharing vertex A, to find a tetrahedron T, where edge segment AB passes through the base of tetrahedron T (box 52).

Figure 9:
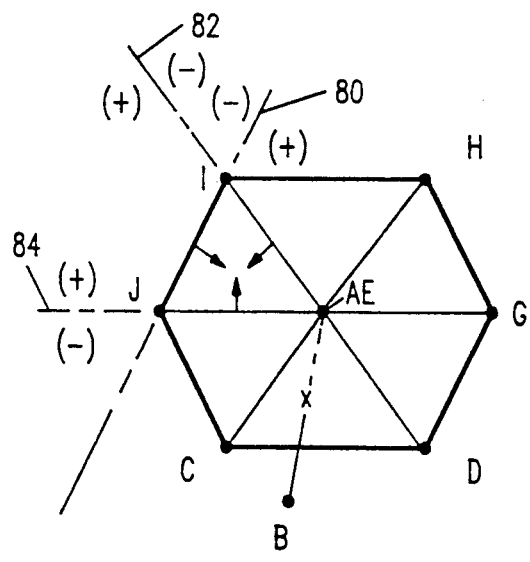
FIG. 9 shows how the tetrahedral face intersected by line segment AB can be found through the use of planes coincident with the planes of mesh tetrahedra.

This search is accomplished as shown in FIG. 9 by considering each of the surfaces of the incident tetrahedron (i.e., tetrahedron AEIJ) as planes. The side of a plane closest to the interior of the tetrahedron is classified as the plus side and the opposing side is classified as the minus side. As can be seen in FIG. 9, plane 80 is coincident with the surface AIJ, plane 82 is coincident with surface AIE and plane 84 is coincident with surface AJE. Starting at vertex E, and proceeding in a counterclockwise manner, the equations for each plane are found and it is determined whether vertex B is on the plus or minus side of the respective plane. If the vertex B falls on the negative side of any of the planes, the procedure goes to the tetrahedron which shares that plane. In FIG. 9, the only plane fulfilling that criteria is plane 84 and it can be seen that tetrahedron AEJC is the next one to be considered. The analysis of that tetrahedron leads to tetrahedron AECD as it is the plane coincident with tetrahedral plane AEC (which has a negative value in relation to vertex B.

If it turns out that more than one plane is "negatively" placed with respect to vertex B, then the one with the smallest absolute displacement value to point B is the one chosen. This search terminates when vertex B is on the positive side of all of the plane constructs. It is to be noted, that this will occur when tetrahedron AECD is found. By viewing FIG. 9 from the vantage point of vertex B (end-on), the above-described planar relationships can be visualized.

Returning to FIG. 6, once tetrahedron T is found, it is determined whether edge segment AB passes through a vertex X of the base of tetrahedron T. If so, that edge segment (i.e., AX) is stored (box 56). (No further actions are required, as AX is a boundary of a tetrahedron and the criteria is satisfied, at least for this line segment).

Figure 10:
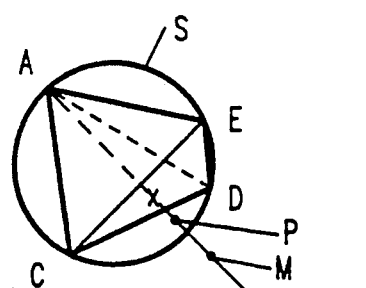
FIG. 10 is a view of the tetrahedron found in FIG. 9, after its circumsphere has been constructed and the intersection point between it and line segment AB found.

If it is determined that line segment does not pass through a vertex X (box 54), then the circumsphere S which was calculated and stored during the original Delaunay mesh generation is found (box 58). As shown in FIG. 10, circumsphere S has two points of incidence with line segment AB, i.e., vertex A and point P. Since the coordinates of vertices A and B are known, as well as the equation for circumsphere S, the point of intersection P of line segment AB with S can be found (box 60, FIG. 6). Then, a mid-point M of line segment AB is found (box 62), and the positions of points P and M are compared with respect to vertex A (box 64). Whichever of points P or M is found to be further from vertex A is set equal to a new vertex point X (boxes 68, 70), and that value is inserted into the tetrahedrization, (box 70) to obtain a modified tetrahedrization including a new segment AX. The value of A is then assigned equal to X (box 72) and the program continues as shown in FIG. 6 until all edges of the model have been considered.

Figure 11:
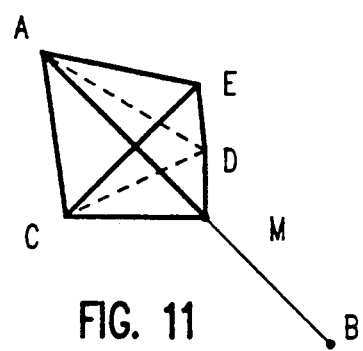
FIG. 11 shows the tetrahedron of FIG. 10 after an additional vertex point has been placed on line segment AB.

The above described construct can be seen in FIGS. 10 and 11, with FIG. 10 showing the relative positions of points P and M on line segment AB. In FIG. 11, the ending tetrahedrization is shown indicating the new point X. It can be understood that the choice of the further of the two points from vertex A, enables both a new set of tetrahedra to be generated, and for the number of points along the model edge to be minimized.

At this point, it is known that all of the edges of the current face are now coincident with tetrahedra edges. However, it is not known whether any edge of a tetrahedron intersects the face of the model. This must now be determined, and wherever such an intersection is found, the "offending" tetrahedron must be trimmed and a new triangle added to the face of the model which eliminates the edge/face intersection. The procedures for accomplishing such actions are shown in the flow diagram of FIGS. 12 and 13 and are further illustrated by the geometric constructs shown in FIGS. 14-25.

Figure 12:
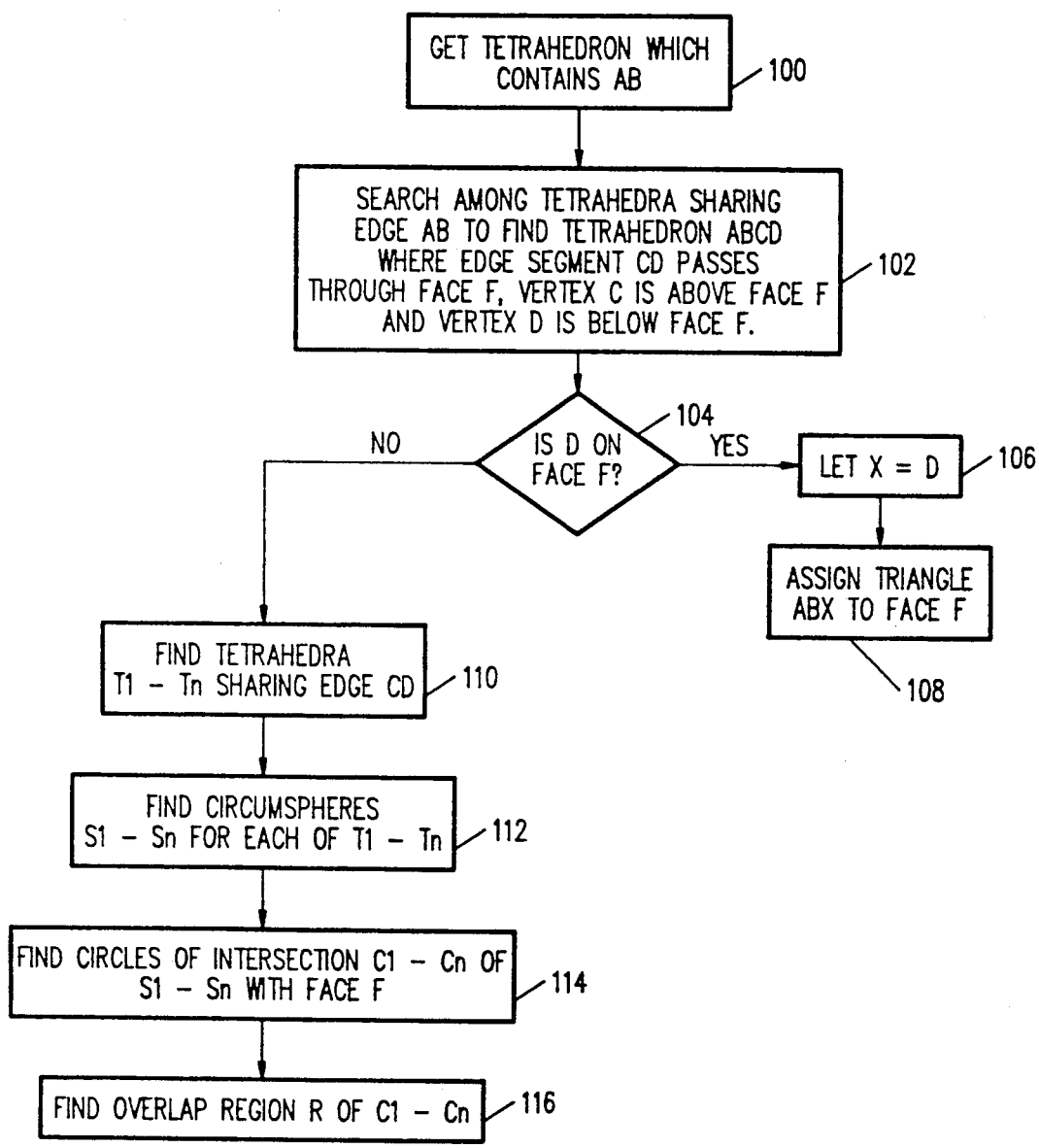
FIGS. 12 and 13 are high level flow diagrams illustrating the face trim procedure of the invention.
Figure 15:
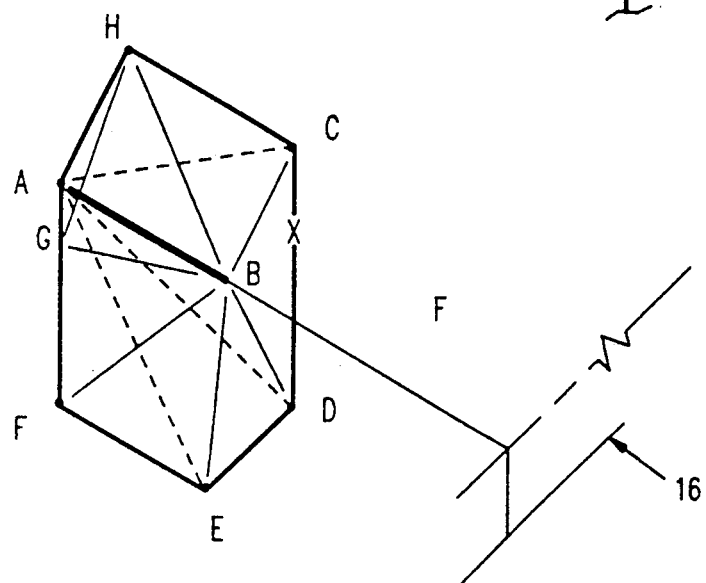
FIG. 15 is a perspective view of line segment AB showing other tetrahedra which share that segment, in addition to tetrahedron ABCD.

Turning to FIG. 12, the face trim procedure commences by finding any tetrahedron which contains model edge segment AB (box 100), and then proceeds to find if such tetrahedron has an edge which intersects a face F of the model. Such a tetrahedron, can be visualized by examining FIG. 14 wherein the model is shown having face F, with tetrahedron edge CD intersecting that face. The method searches among tetrahedra which share model edge segment AB to find the tetrahedron ABCD whose edge CD passes through face F and whose vertex C is above face F and vertex D is below face F (box 102). In FIG. 15, all tetrahedra sharing model edge segment AB are shown in perspective, and in FIG. 16, a view taken along line 16—16 in FIG. 15 shows the relationship of surface face F to tetrahedral edge CD.

Figure 16:
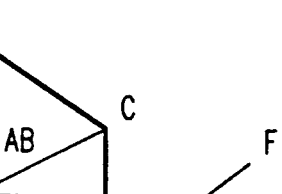
FIG. 16 is a view of FIG. 15, taken along line 16—16.
Figure 17:
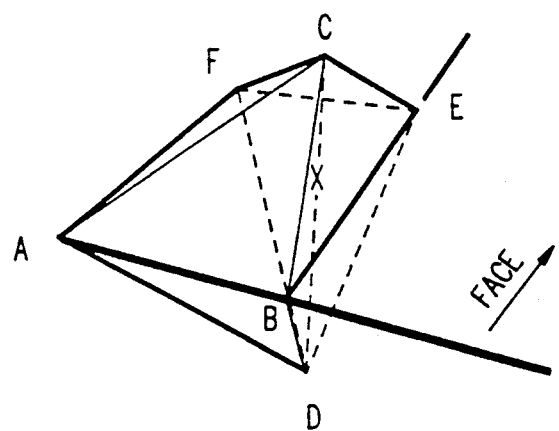
FIG. 17 is a perspective view of a model face with four tetrahedra that violate the totally in/totally out criteria.
Figure 18:
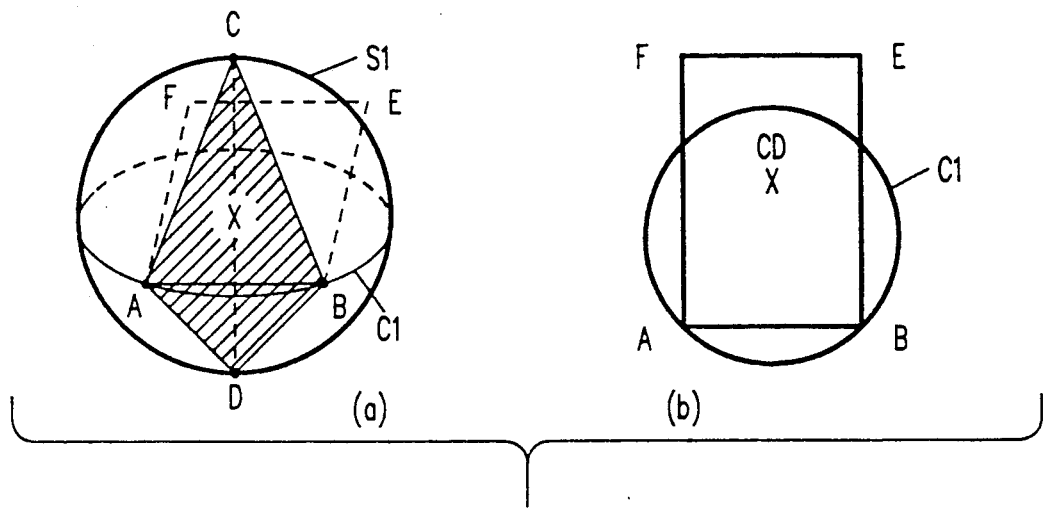
FIG. 18a shows a circumsphere drawn about tetrahedron ABCD and its circle of intersection with the face of the model.
FIG. 18b is a plan view of the circle of intersection of circumsphere ABCD with the face of the model.
Figure 19:
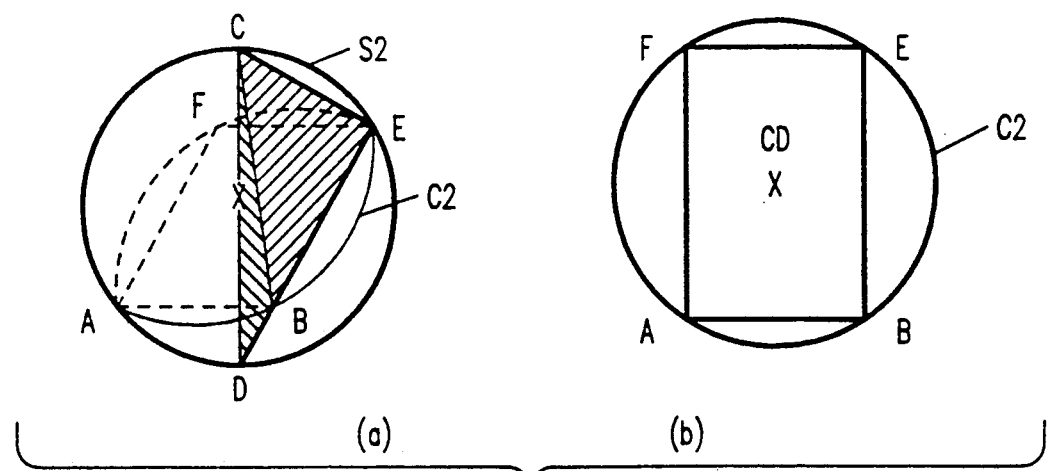
FIG. 19a shows a circumsphere drawn about tetrahedron BECD.
FIG. 19b shows the circle of intersection of circumsphere BECD with the model face.
Figure 20:
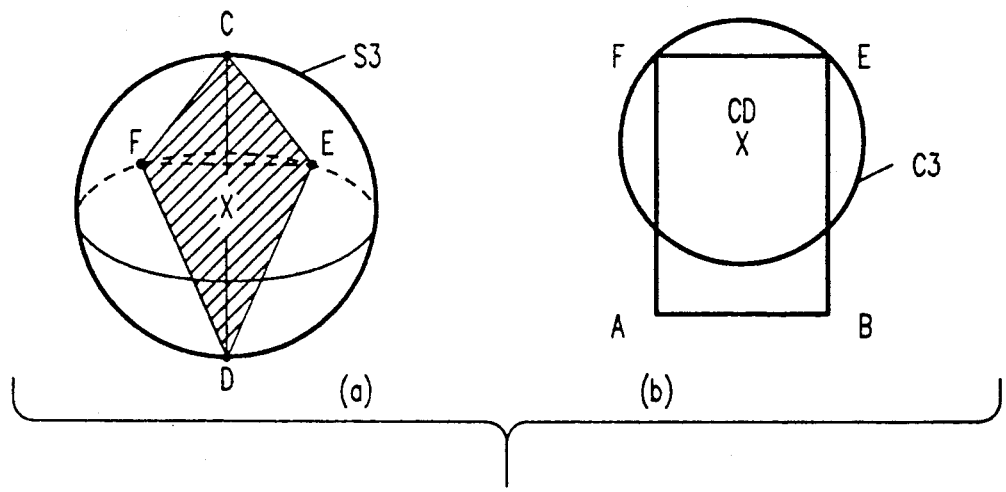
FIG. 20a shows a circumsphere drawn about tetrahedron EFCD.
FIG. 20b shows the circle of intersection of circumsphere EFCD with the model face.
Figure 21:
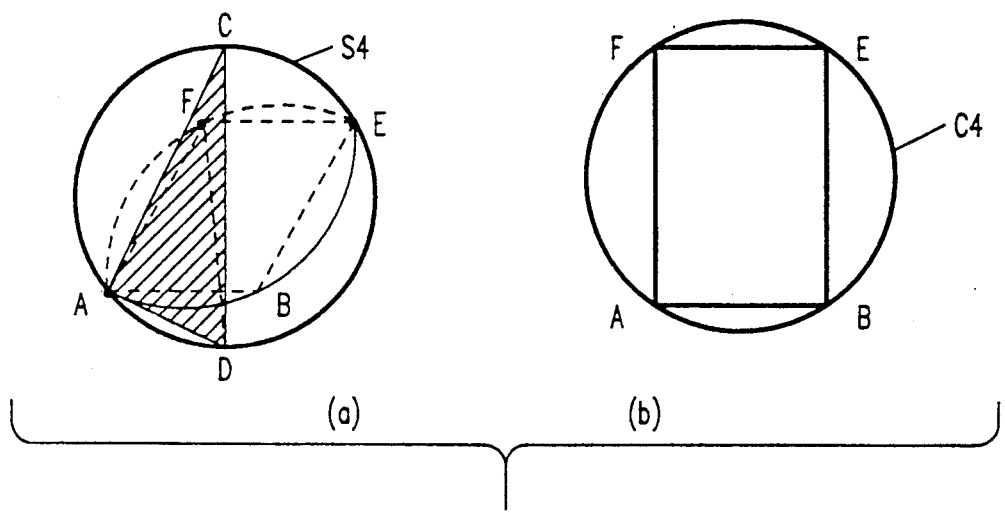
FIG. 21a shows a circumsphere drawn about tetrahedron AFCD.
FIG. 21b shows the circle of intersection of circumsphere AFCD with the model face.

Returning to FIG. 12, if vertex D is coincident with face F, then new vertex point X is set equal to D (box 106), and a new triangle ABX is assigned to face F. Since, as shown in FIGS. 15 and 16, vertex D is not on face F, the program proceeds to search tetrahedra T1-Tn which share edge CD (box 110). In FIG. 17, tetrahedral edge CD is shown along with its common tetrahedra ABCD, BECD, EFCD, and FACD. All circumspheres S1-Sn for each of tetrahedra T1-Tn are identified (box 112, FIG. 12) and circles of intersection C1-Cn of S1-Sn with face F are also found (box 114).

The region of overlap R of all of circles of intersection C1-Cn is then found (box 116).

In FIGS. 18-22, the geometric constructs referred to in boxes 111, 114, and 116 are illustrated. It is to be understood that the constructs of FIGS. 18-22 are substantially simplified over what would normally be encountered in a tetrahedral mesh; however they are sufficient to illustrate the method of the invention.

In FIG. 18a, a circumsphere S1 is illustrated which encompasses tetrahedron ABCD. Also shown in dotted form is the footprint ABEF of all four tetrahedra T1-T4 on face F. Since the vertex points of face F and the equation of circumsphere S1 are known, the circle of intersection C1 can be found. Circle of intersection C1 and its relation to footprint ABEF is shown in FIG. 18b.

Figure 22:
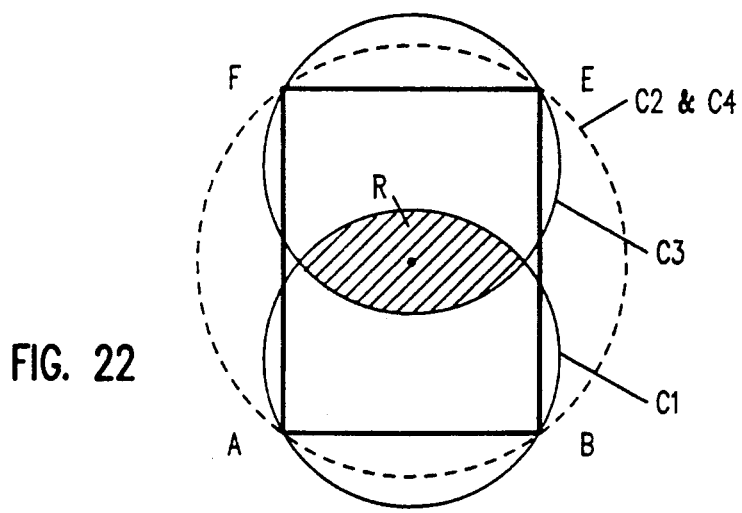
FIG. 22 is a composite view of all of the above-noted circles of intersection, showing a region of overlap.

In FIG. 19a, circumsphere S2 for tetrahedron BECD is shown along with its circle of intersection C2 with face F. In FIG. 19b, circle of intersection C2 is shown in relation to footprint ABEF. In FIGS. 20a and 21a, circumspheres S3, S4 are shown for tetrahedra EFCD and AFCD, respectively. In addition, their respective circles of intersection with face F, C3 and C4, are shown in FIGS. 20b and 21b respectively. In FIG. 22, a composite is shown of all of circles of intersections C1-C4 and indicates a region R of overlap thereof.

Figure 13:
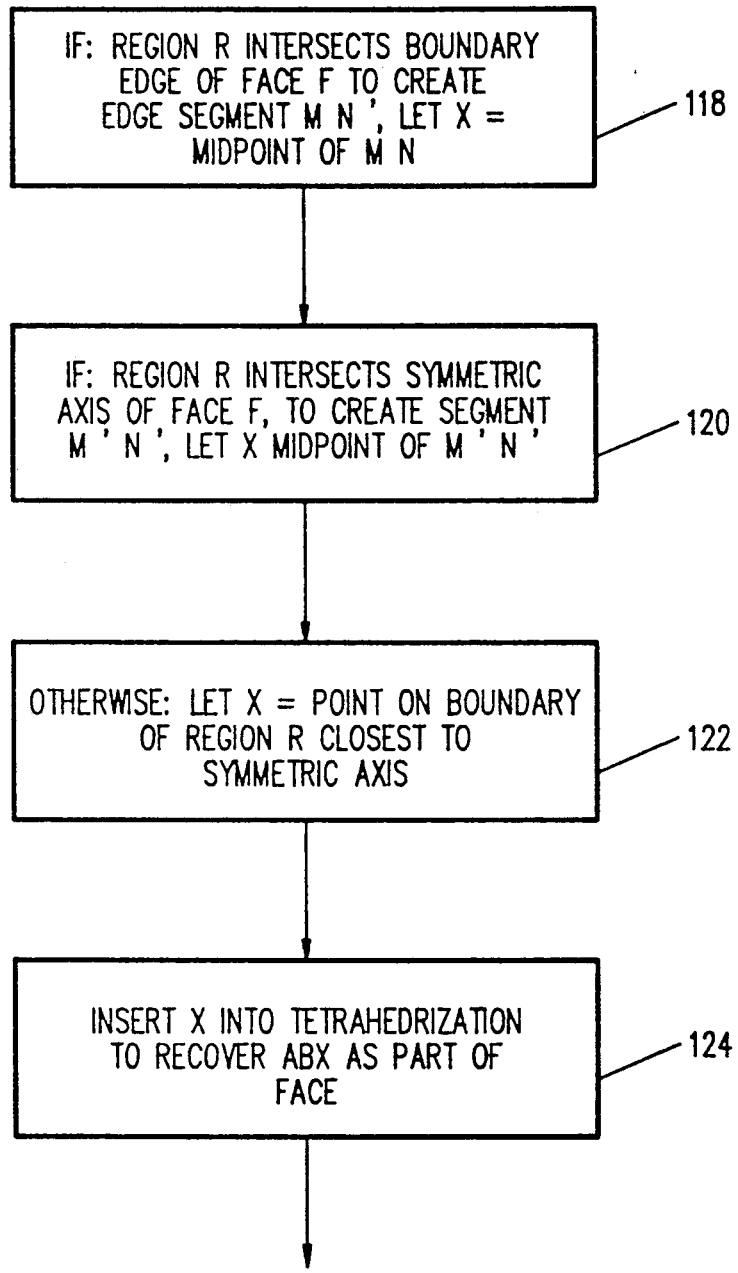
Figure 14:
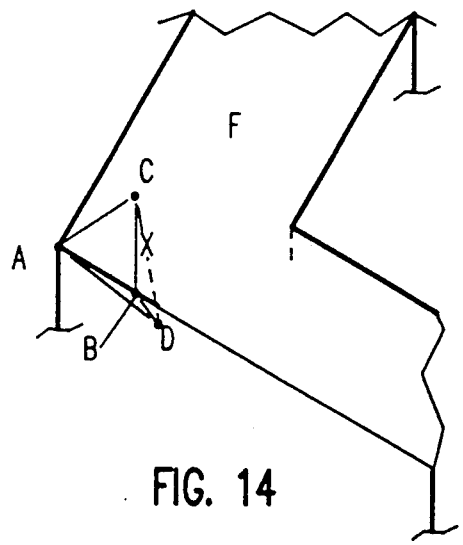
FIG. 14 is a perspective view of a portion of face F of a model, showing a tetrahedron ABCD having a line segment CD that intersects face F.
Figure 23:
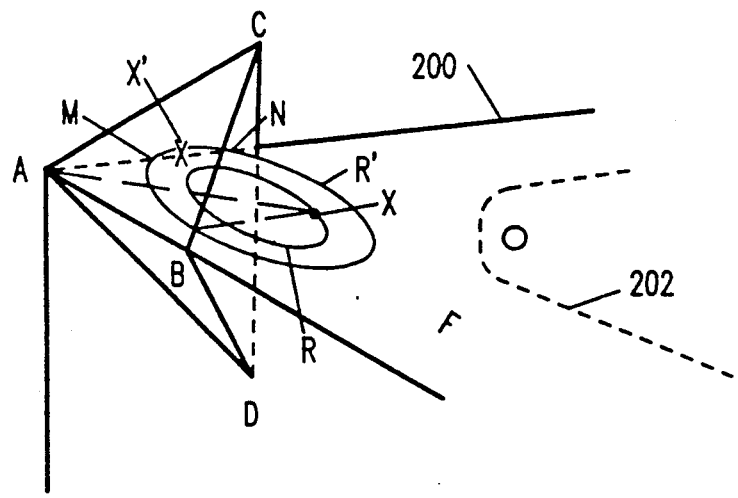
FIG. 23 shows a face of the model with the region of overlap superimposed thereon, indicating the point of placement of an added vertex point
Figure 24:
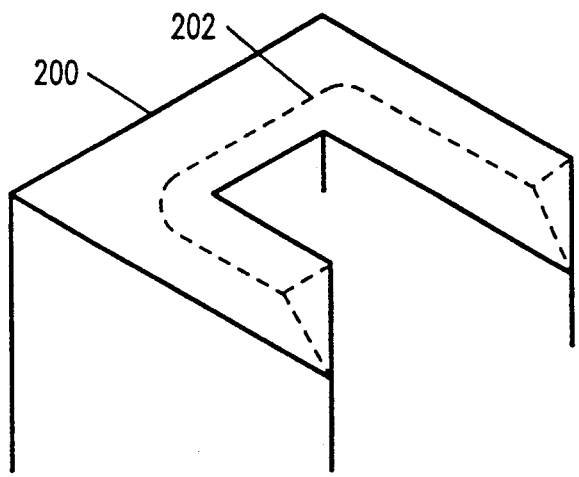
FIG. 24 is a perspective view of the model showing a centerline of symmetry thereof.

Turning to FIG. 13, once region R is determined, it is initially determined if it intersects any boundary edge of model face F. If so, those points of intersection are designated M and N. Then, the value of a new vertex X is set equal to the mid-point coordinate between points M and N. Referring to FIG. 23, such a region R' is shown intersecting edge 200 of face F. It can there be seen that points M and N along edge 200 are defined by the intersection of R' therewith. The value of the new vertex point X' is set equal to the mid-point between M and N. If, on the other hand, region R (FIG. 23) intersects the symmetric axis of face F to create a segment M'N', then X is set equal to the mid-point of M'N'. In FIG. 23, the symmetric axis 202 is shown, in part, and is better illustrated in FIG. 24. It essentially is an axis of local symmetry of a face F.

In this instance, since region R does not intersect axis of symmetry 202, the program proceeds from box 120 to box 122 in FIG. 13 and sets the value of the new vertex point X equal to the point on the boundary of region R which is closest to symmetric axis 202. Once point X is determined, it is inserted into the tetrahedrization (box 124) and triangle ABX is recovered (see FIG. 23) as part of face F.

Figure 25:
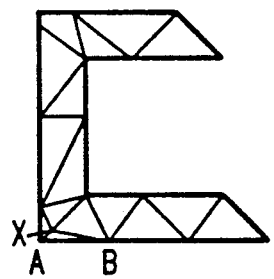
FIG. 25 is a plan view of a face of the model, after an additional vertex has been placed thereon and the triangle created thereby removed, prior to subsequent processing.

At this stage, the program reverts to box 40 in FIG. 5 to determine if vertex X is a new point. Since it is, the program recycles to again perform the edge trim procedure and continues until all model edge segments have been considered. After each new triangle is found and tested, in accord with the above, (as shown in FIG. 25), it is removed from the list and thereby leaves the remaining tetrahedra for subsequent consideration. The procedure eventually terminates after all triangles are recovered.

The use of the region of overlap R to determine placement of a new vertex enables that vertex to be placed as far as possible from the other two vertices of the mesh triangle while still maintaining the Delaunay properties of the mesh. In essence, therefore, the number of new vertices are thereby minimized.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for producing a mesh of finite elements entirely within a body to be analyzed, said body exhibiting edges and faces, said method performed by a computer system in a combination with a software program; said method comprising the steps of:
   a. producing an initial mesh of elements for said body, each said element having a plurality of vertices and edges;
   b. finding any body edge segment which is not coincident with an element edge and adding a vertex on said segment, said vertex positioned to minimize the number of added vertices on said body edge segment;
   c. creating additional finite elements by connecting said added vertex to adjacent close vertices;
   d. finding a finite element having an edge coincident with an edge segment of said body, and positioned so that a face of the body passes through another edge of said found finite element, between vertices defining said another edge; and
   e. placing a new vertex on said body face in the vicinity of an intersection of said another edge and said body face, said new vertex positioned so as to minimize the number of added vertices, and creating additionally finite elements by connecting said added vertex to close vertices.

2. The method as recited in claim 1 further comprising the steps of:
   f. repeating steps a-e each time a new vertex is placed and connected in step e, until each finite element is entirely within or entirely without the faces of said body.

3. The method as recited in claim 2 wherein each said finite element is a tetrahedron.

4. The method as recited in claim 3 wherein step b comprises the steps of:
   b1. finding a tetrahedron having a vertex coincident with a first end of said body edge segment, said body edge segment intersecting a base of said tetrahedron at other than a vertex defining said base;
   b2. finding the circumsphere defined by said tetrahedron;
   b3. finding an intersection P of said body edge segment with said circumsphere;
   b4. finding a mid-point M of said body edge segment; and
   b5. inserting a new vertex on said body edge segment at a point between the ends of said body edge segment, said new vertex point being placed at point M, unless said point P is further away from said first end of said body edge, in which case said new vertex point is placed at point P.

5. the method as recited in claim 3, wherein steps d and e comprise the further steps of:
   d1. finding a first tetrahedron having an edge coincident with a body edge;
   d2. searching among tetrahedra sharing said edge to find a tetrahedron having an edge intersected by said body face;
   e1. determining if said body face intersects said edge at a vertex of said tetrahedron and if so, connecting said vertex to the vertices of said shared edge and designating the thus-created triangle as part of said face.

6. The method as recited in claim 4 wherein said step e comprises the further steps of:
   e2. finding circles of intersection with said body face of circumspheres for tetrahedra having said shared edge;
   e3. determining a region of overlap of said circles of intersection; and
   e4. placing said new vertex point in said region of overlap, on said body face.

7. The method as recited in claim 6 wherein said region of overlap intersects an edge of said body face, and creates an intersecting edge segment MN along said edge, said new vertex point being placed at a mid-point of said edge segment MN.

8. The method as recited in claim 6 wherein if said region of overlap does not intersect an edge of said body face, but does intersect a symmetric access of said body face and creates a segment MN within said region of overlap on said symmetric access, placing said new vertex point at a mid-point of segment MN.

9. The method as recited in claim 6 wherein, if said region of overlap intersects neither an edge of said body face nor an axis of symmetry of said body face, said vertex is placed at a point in said region which is closest to said axis of symmetry.

* * * * *

UNITED STATES PATENT AND TRADEMARK OFFICE
CERTIFICATE OF CORRECTION

PATENT NO. : 5,125,038
DATED : 06/23/92
INVENTOR(S) : Meshkat et al

It is certified that error appears in the above-indentified patent and that said Letters Patent is hereby corrected as shown below:

Claim 8, Column 10, line 5, "access" with --axis--.
                            line 7, "access" with --axis--.

Signed and Sealed this

Twelfth Day of July, 1994

Attest:

BRUCE LEHMAN

Attesting Officer        Commissioner of Patents and Trademarks